INVENTOR.
ROBERT J. KELLY
LESTER R. YATES
DONALD H. JUDD

BY Killman and Lamb
ATTORNEY.

United States Patent Office 3,302,199
Patented Jan. 31, 1967

3,302,199
DISTANCE MEASURING SYSTEM
Robert J. Kelly, Towson, Lester R. Yates, Timonium, and Donald H. Judd, Baltimore, Md., assignors to The Bendix Corporation, Towson, Md., a corporation of Delaware
Filed May 27, 1964, Ser. No. 370,570
10 Claims. (Cl. 343—7.3)

The present invention relates to distance measuring equipment. More particularly, it relates to an improvement in aircraft navigation equipment of the type providing a continuous indication of distance from an interrogating aircraft to a responding ground beacon.

Distance measuring equipment is now in common use operating on standard frequencies with standard forms of signal. Broadly, the equipment is based upon the principle that radio waves are propagated at a known constant velocity, namely that of light, so that the time elapsing between the transmission of an interrogating signal and the reception of a response from a ground beacon is exactly proportional to the distance traveled by the wave. In practice the airborne equipment includes a pulse modulated transmitter, a receiver, and an accurate time measuring device, oftentimes referred to as a strobe unit or a range circuit. Time measurement commences with the transmission of a pulse pair and ceases upon reception of a properly coded reply to the transmitted pulses. After allowance for certain constant delays intentionally introduced in both the airborne and ground based equipment, the measured time is displayed upon an indicator directly calibrated in units of distance.

The range circuits commonly are founded upon a phantastron timing circuit which provides a gate voltage of duration varying linearly from about $75^{\mu s}$ to $2000^{\mu s}$, depending upon the magnitude of an applied control voltage. When the duration of the phantastron gate voltage is adjusted to equal the elapsed time between transmission of an interrogation signal and the reception of the reply, the phantastron control voltage required to achieve that adjustment is analogous to the distance between the interrogating and responding stations.

Present distance measuring equipment is considerably refined. Provision is made for wholly automatic operation. When first placed in operation, the equipment commences a search mode during which the phantastron control voltage is varied at a constant rate until it arrives at such a level that the phantastron output signal coincides with a reply from a station. At that time, the equipment enters a track mode during which the time difference between the phantastron output and the station reply is formulated into an error signal for a closed loop servo system. The reply time from the ground based station constitutes the independent input variable to a range servo. The servo motor drives a potentiometer which supplies the phantastron control voltage, thus closing the feedback loop. The shaft position of the servo motor is recorded by a rotation counter or an equivalent mechanism calibrated in units of distance.

It is thus apparent that the accuracy of the equipment depends primarily upon the accuracy of the response of the phantastron to its control voltage. Other sources of error may be present, such as pulse distortion or interference from echoes, but no other source, saving malfunction of the equipment, is capable of introducing a continuous error regardless of the purity of the signals received. As an example of the stringent requirements placed upon the phantastron, a system might be designed for 100 miles maximum range with an accuracy of 0.1 mile. The phantastron control voltage would vary from zero to 100 volts. It would then be necessary for the phantastron to produce an output signal ranging up to $1237^{\mu s}$ maximum delay accurate to within approximately $1.2^{\mu s}$, all in linear response to a control voltage of from zero to 100 volts. In other words, it is necessary in such a system for the phantastron to resolve control voltage variations of as little as 0.1 volt to within $1.2^{\mu s}$ of the correct value.

In many present systems, no attempt is made to control the phantastron so closely. Instead, the phantastron is used to provide a coarse indication of distance (within 10 miles) and a phase shifter is provided to move pulses from a highly stable source into precise coincidence with the return signal. The phantastron need only respond to within approximately $124^{\mu s}$ of the correct value, while the stable pulse source, usually an 8088 c.p.s. oscillator need only be maintained within 1% frequency stability to prevent the introduction of greater than 0.1 mile error from that element. The need remains, however, for a linear phase shifter operable through 360°. Generally, in order to relax tolerances on the phase shifter, the frequency of the stable pulse source is more closely controlled than 1%. Still the phase shifter must provide at least 1% linearity in order to preserve system accuracy of 0.1 mile.

It is an object of the present invention to eliminate the requirement for linear phase shifters in distance measuring equipment.

Another object of the invention is to eliminate the requirement for stable oscillators as a means for fine measurement in distance measuring equipment.

A further object is to provide distance measuring equipment in which a phantastron range circuit is sufficiently closely controlled to provide distance measurement from the phantastron output alone with accuracy at least equaling that of existing, more complicated, systems.

Another object is to provide distance measuring equipment which, automatically during operation, periodically tests the accuracy of the distance indication and provides self-correction for errors therein.

Adjunctive to foregoing, the invention also provides means enabling the user to test the operation of the equipment by actuating a test circuit. Any distance indication, other than zero, then represents the amount of error present in operation.

A further object is to provide distance measuring equipment capable of performing a range search at higher speed than heretofore considered practical.

Another object is to provide distance measuring equipment of reduced complexity, cost, weight and volume thereby benefiting in an obvious manner over existing equipment.

Other objects and advantages of the invention will become evident as a more complete understanding of its construction and operation is gained through study of the following detailed description and the accompanying drawings.

Briefly, the present invention in distance measuring equipment comprises means for periodically applying a reference control voltage to the phantastron range circuit. The resulting phantastron delay is compared with a standard delay and, if error exists, adjustment is made in the range circuit by means of a closed loop feedback arrangement.

Figure 1:
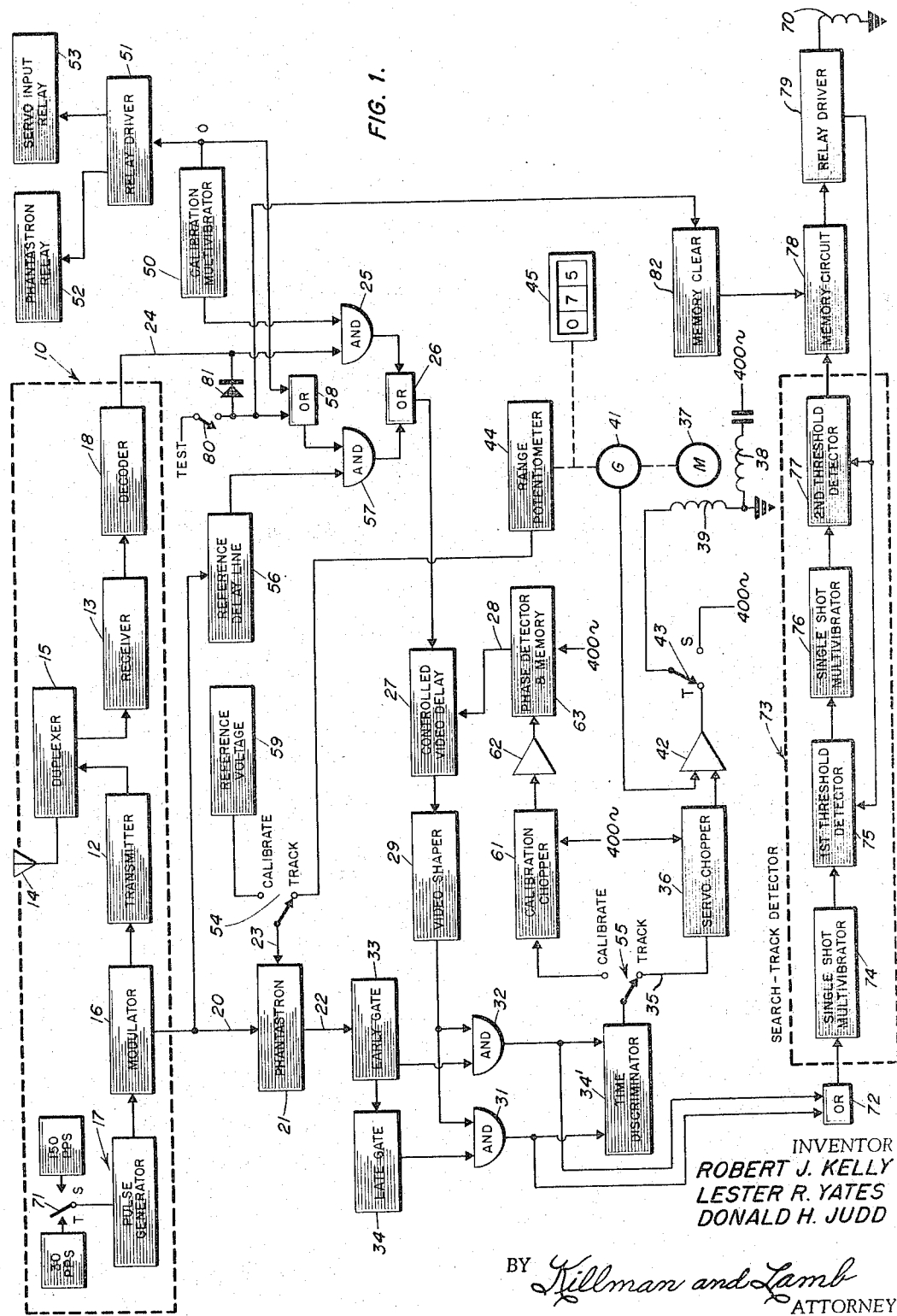
FIG. 1 is a functional block diagram of the Distance Measuring System of the invention.

In the block diagram of FIG. 1, the elements in common use in distance measuring systems are enclosed in the dashed-line box 10. These include a transmitter 12 and receiver 13 sharing a common antenna 14 through a duplexer 15. The transmitter is pulse modulated at the standard frequencies of 30 p.p.s. and 150 p.p.s. by means of a modulator 16 and pulse generator 17. The frequency of pulse generator 17 is selected automatically by contacts 71 on the search-track relay, later to be more fully considered. The higher pulse frequency of 150 p.p.s. is employed during the search mode of the equipment. When ample replies from an interrogated station are received, means later described actuate the search-track relay to change the frequency of pulse generator 17 to the lower value of 30 p.p.s.

The modulator 16 generates a pair of pulses spaced $12^{\mu s}$ apart for each pulse received from generator 17. Pulse pairing and spacing conforms to current standards. Upon receiving the standard pulse group the interrogated station, replies after a fixed delay of $50^{\mu s}$. The reply is also in the form of a pulse pair with $12^{\mu s}$ spacing, as established by standards. Obviously the standards may be changed, and while it may be necessary to alter constants in the system to conform to the change, the principle of operation will not be affected.

The pulse pair from the interrogated station is amplified and detected in the usual manner in the receiver 13, whence the video pulses are applied to decoder 18. The decoder 18 ordinarily comprises a delay line of length equal to the spacing between received pulses, and a coincidence circuit. The receiver output and the delayed receiver output are compared in the coincidence circuit. If the spacing of the received pulses is equal to the time length of the delay line, the second pulse of the pair arrives at the coincidence circuit simultaneously with the first pulse of the pair, producing a single decoder output pulse.

The decoder output will now be followed through the range measuring portion of the system as if the equipment were operating in the track mode. The calibrate and search functions will then be described.

Upon the generation in modulator 16 of the second pulse of the pair to be transmitted, a trigger impulse is applied through line 20 to a phantastron delay circuit 21. Immediately the phantastron circuit produces, on line 22, a gate voltage which will endure for a time proportional to the magnitude of a control voltage applied on line 23. Simultaneously with the triggering of phantastron 21, the second pulse is transmitted to the interrogated station. The first pulse of the pair will have been transmitted $12^{\mu s}$ previously. After a time lapse dependent upon the range, the first pulse arrives at the interrogated station, followed in $12^{\mu s}$ by the second of the transmitted pulses. The arrival of the second pulse initiates a response by the interrogated station. The transmission of the first pulse of the response pair, however, is delayed intentionally $50^{\mu s}$ at the interrogated station following reception there of the first of the interrogating pulses. Again following a lapse dependent on range, the first of the response pulses is received and applied to the decoder 18, whence appears an output, upon the reception of the second of the response pulses at line 24.

The video output on line 24 is conducted through an "and" gate 25, assumed during this portion of the description to be enabled, thence through an "or" gate 26 to a controlled delay circuit 27. The delay circuit 27 may be in the form of a single-shot multivibrator, the period of which depends upon a control voltage present on line 28. The video pulse from "or" gate 26 then triggers the delay circuit 27 producing a discharge ideally of square waveform. It will be assumed that the control voltage on line 28 is of such value as to terminate the output of the delay circuit $50^{\mu s}$ after the appearance of the video pulse from gate 26. The trailing edge of the square wave from circuit 27 is obtained by differentiation and reformed in a shaping circuit 29 for application to a pair of coincidence gates 31 and 32.

The trailing edge of phantastron gate voltage on line 22 triggers an early gate 33 which produces a square wave gate voltage of $25^{\mu s}$ duration. The output of gate 33 is supplied both to a late gate 34 and to coincidence gate 32. In the late 34, the trailing edge of the early gate waveform triggers the generation of a square wave gate output also of $25^{\mu s}$ duration. The output of late gate 34 enables coincidence gate 31.

When tracking, the phantastron control voltage is of such value that the phantastron gate terminates at the proper time to cause the early gate-late gate trigger cycle to span the arrival of video in coincidence gates 31 and 32. When no tracking error exists, the video pulse will be centered on the trailing edge of the early gate and the leading edge of the late gate causing coincidence gates 31 and 32 to be conductive equal lengths of time. If an error exists, the phantastron gate may terminate too early, causing the video pulse to be entirely contained within the late gate, or if the phantastron gate terminates too late, the video pulse will be entirely contained within the early gate.

The outputs of coincidence gates 31 and 32 are fed to a time discriminator circuit 34' which produces, on line 35, a positive or negative error voltage, according to whichever of the coincidence gates conducts the longer period. The error voltage is passed through the T contact of a calibrate-track relay 55, the function of which will later be considered, to a servo chopper 36 driven from a 400 c.p.s. A.C. supply. The servo motor 37 is a conventional two phases induction motor. The motor 37 includes a fixed field 38 supplied with current in quadrature phase to current from the 400 c.p.s. supply by means of a phase shifting capacitor. Current in the motor control field 39 is either of the same phase or of opposite phase to the 400 c.p.s. source depending upon the polarity of the error voltage on line 35. Thus, the motor 37 will run in either direction according to the error voltage polarity. As is conventional, the output of chopper 36 is combined with the output of a rate generator 41, provided for damping purposes, in an amplifier 42 for application to the control field 39. Contacts 43 on the search-track relay provide error signal input to the control field of motor 37 or a constant voltage from the 400 c.p.s. source, causing the motor to run continuously for search purposes. A range potentiometer 44 is geared to motor 37 and supplies the phantastron control voltage thereby closing the tracking servo feedback loop. A revolutions counter or similar position indicator 45, calibrated in units of range, is connected to the shaft input of potentiometer 44 to provide an indication of the range to the interrogated station.

Figure 2:
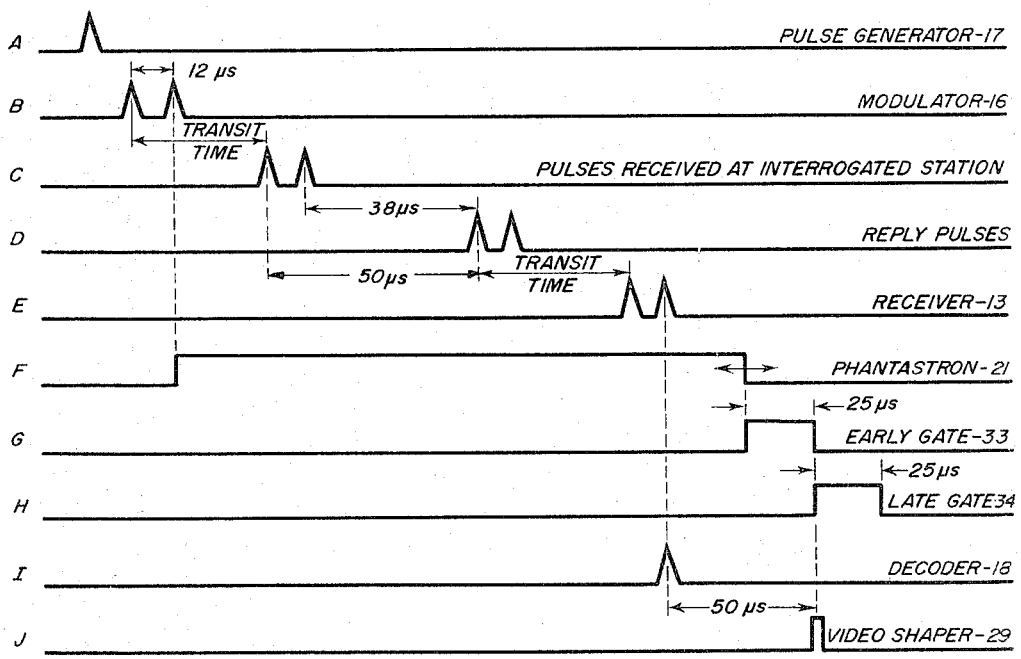
FIG. 2 is a timing waveform diagram for the track mode operation of the invention.

The operation of the equipment in the track mode will now be reviewed with reference to the timing diagrams of FIG. 2. Interrogation commences with a pulse output from generator 17 (waveform A). A slight delay may be introduced prior to the generation of the modulating pulse pair in the modulator 16 (waveform B). After a time lapse corresponding to range, the first of the transmitted pulses arrives at the interrogated station, followed in $12^{\mu s}$ by a second of the transmitted pulses (waveform C). Coincidence of the pulse pair C at the interrogated station initiates a reply, which, however, is delayed an additional $38^{\mu s}$ for a total delay of $50^{\mu s}$ before transmission of the reply (waveform D). After a lapse corresponding to the return transit time, the first of the reply pulses arrives at the receiver 13 (waveform E). The second of the pulses B initiates the phantastron gate (waveform F) which continues for a length of time determined by the control voltage from range potentiometer 44. The variable duration of the phantastron gate is indicated by the arrow at the trailing edge of the gate waveform. Termination of the gate from phantastron 21 triggers the early gate 33 (waveform G), which has a precise duration of $25^{\mu s}$. The early gate trailing edge triggers the late gate 34 (waveform H) which also lasts for $25^{\mu s}$. It will later be clear, however, that the duration of the late gate need not to be as precisely controlled as the duration of the early gate.

Prior to the termination of the phantastron gate and the generation of the early and late gates, coincidence of the reply pulses E produces a video output pulse from decoder 18 (waveform I). The delay introduced by the controlled video delay circuit 27 is shown at a nominal value of 50µs in waveform J. The latter delay is variable however, to compensate for errors in the relationship between the phantastron gate duration and the control voltage output of the range potentiometer. Waveform J is sown centered on the trailing edge of the early gate and the leading edge of the late gate, hence, no error voltage will be applied to the range tracking servo. If the range to the interrogated station were to increase, waveforms C, D, E, I and J would move to the right, reflecting the greater transit time of the interrogation and reply pulses. Video pulse J would then appear either wholly or, at least, principally within the late gate waveform H. An error signal from time discriminator 34' would result of such polarity as to cause the servomotor to increase the output voltage of the range potentiometer. This would cause the trailing edge of the phantastron gate to move to the right until the video pulse J was again centered between the early and the late gate waveforms. If the range to the interrogated station were to decrease, the opposite train of events would occur.

From FIG. 2 it will be seen that the duration of the phantastron gate F, plus the duration of the early gate G, is equal to the sum of twice the transit time, plus the 50µs delay at the interrogated station, plus the nominal 50µs delay in circuit 27. The duration of the phantastron gate at zero range is therefore ideally equal to 75µs.

The minimum rotation of potentiometer is fixed at a position which produces a control voltage corresponding to a 75µs phantastron gate. If, as a result of circuit instabilities, the potentiometer voltage output at zero range were to produce a phantastron gate of say 80µs, the error signal input to the tracking servo would be such as to cause the servo motor to attempt a reduction in the potentiometer ouput. Obviously, such reduction cannot be permitted as the range indicator would then yield the absurd result of negative range. At greater than zero ranges, the 5µs phantastron offset error persists, causing a range to be indicated which is consistently short of the true value.

The variable delay circuit provides means for compensating for the offset error in the phantastron gate timing. If the delay in circuit 27 is adjusted to be 5µs more than the nominal 50µs value, a phantastron gate duration of 80µs is then the correct value for zero range and the offset error is eliminated. Similarly, the offset error may be in the opposite direction, in which event the delay of circuit 27 must be adjusted for less than the nominal 50µs value. The following portion of the description is devoted to the calibrate mode of the equipment, in which automatic periodic adjustment of delay circuit 27 is accomplished to eliminate phantastron offset errors.

Again referring to FIG. 1, a free-running calibration multivibrator 50 produces a square waveform of asymmetrical period with approximately a one-second off or "zero" period and a four-second on or "one" period. The "zero" output of multivibrator 50 is amplified in a relay driver 51 and used to energize a phantastron input relay 52 and a servo input relay 53. The contacts 54 of relay 52 are shown adjacent the phantastron 21. The contacts 55 of relay 53 appear at the output of time discriminator 34'. When the relays are energized both sets of contacts 54 and 55 are in the calibrate position.

The second pulse of the pair from modulator 16 is applied to a reference delay line 56 of 50µs length, thus introducing a delay corresponding to the standard 50µs delay at the interrogated station. The output of delay line 56 enters an "and" gate 57 which is enabled by the appearance of a "zero" output from multivibrator 50 through an "or" gate 58. Simultaneously, with the enablement of "and" gate 57, contacts 54 are moved by relay 52 into the calibrate position. The control voltage input to phantastron 21 is thereby disconnected from the range potentiometer 44 and connected to a reference voltage divider 59 which supplies the proper constant voltage to adjust the phantastron gate duration to 75µs. Of course, the phantastron may be in error, and this will be determined by the passage of the output of gate 57 through "or" gate 26, the controlled video delay circuit 27, coincidence circuits 31 and 32 to the time discriminator 34'. If the phantastron gate duration is not equal to 75µs the early and late gate coincidence will not occur at 100µs. Consequently, the pulse from the reference delay line 56 through the controlled delay circuit 27, with a total nominal delay of 100µs will produce an error signal output from time discriminator 34'. This error signal is conducted through the contacts 55, now also in the calibrate position as a result of energizing relay 53, to a calibration chopper 61 similar to servo chopper 36. There the error signal is converted to a 400 c.p.s. alternating voltage for amplification in an A.C. amplifier 62 and reconverted to direct current in a phase detector and memory circuit 63. Amplification of the error signal as an alternating voltage is of advantage in eliminating drifts commonly present in direct coupled amplifiers. The phase detector of circuit 63 retains the sense of the original error signal, so that adjustment of the delay circuit 27 will be in the direction of an error signal null. Thus, should the phantastron produce other than the anticipated 75µs gate during the calibrate mode, a voltage is developed on line 28 sufficient to change the delay through circuit 27 an amount equal to the phantastron error. For example, suppose the phantastron 21 produced a gate of 80µs duration in response to the reference control voltage from divider 59. It would then be necessary for the delay in circuit 27 to be increased 5µs over the nominal 50µs value in order that the pulse through the reference delay line 56 and circuit 27 be centered between the early gate 33 and the late gate 34. The closed loop, inverse feedback path through delay circuit 27, time discriminator 34', calibration chopper 61 and phase detector 63, automatically develops the proper control voltage on line 28 to adjust the delay for centering the video pulse between the gates. In the example given, the delay through circut 27 would then be 55µs. Obviously, the phantastron may produce a shorter gate than 75µs, in which case the adjustment of delay circuit 27 would be in the opposite sense. The phantastron offset error determined in the calibrate mode may be expected to be present in the same amount throughout the entire range of the phantastron gate. Therefore, when the calibration multivibrator 50 switches from "zero" to "one" for resumption of the track mode, contacts 54 and 55 revert to the track position and the memory portion of circuit 63 retains the control voltage just developed. Through the ensuing four seconds, while multivibrator 50 is in a "one" condition, the delay through circuit 27 remains at the value established during the previous period of calibration, or, as in the example, at 55µs, thus compensating for the phantastron offset error.

The components constituting the memory portion of circuit 63 and the controlled video delay circuit may suitably comprise a diode-capacitor network having a long discharge time constant and a delay multivibrator, the period or delay of which varies in accordance with an applied control voltage.

Figure 3:
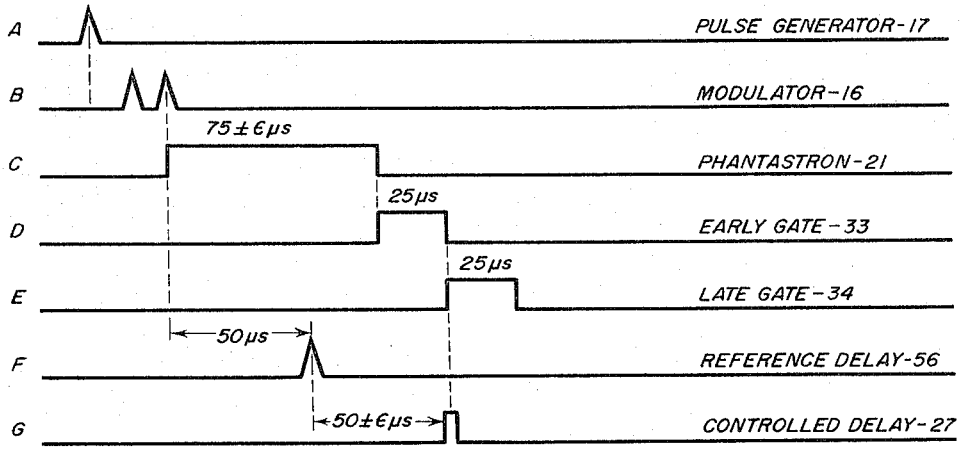
FIG. 3 is a timing waveform diagram for the calibrate mode of operation of the invention.

FIG. 3 is a timing waveform diagram for the calibrate mode. At "A" a pulse appears from generator 17, which is converted into a pulse pair "B" spaced 12µs apart. The later of the pulses B triggers the phantastron 21, just as in the track mode, producing a phantastron gate "C" having a duration of 75µs, plus or minus the error ε. The trailing edge of phantastron gate C triggers the early gate D, the trailing edge of which triggers the late gate E.

The later pulse of the modulator pair B is also applied to the 50µs reference delay line 56, producing the delayed pulse F. Pulse F is applied to the controlled delay circuit 27, which is automatically adjusted by the calibration feedback loop to the proper delay to cause centering of the video pulse between the early and late gates. Pulse G is consequently delayed from pulse F by 50µs, plus or minus the error ε.

The search mode of the equipment will now be described with reference again to FIG. 1. When the equipment is first put into operation, the range to the interrogated station is unknown. It is therefore necessary to conduct a range search in which the phantastron gate is caused to sweep outward from a length corresponding to zero range towards maximum range. The search is, of course, arrested when a true reply is detected. The equipment then switches into the track mode for operation as previously described.

In the search mode, contacts 43 of the search-track relay 70 are in the S position applying a constant voltage to servomotor 37. The range potentiometer 44 is thus driven at a constant rate thereby applying a linearly increasing control voltage to phantastron 21, causing the gate to lengthen with each interrogation. The contacts 71 of the search-track relay also are in the S position switching the frequency of pulse generator 17 to 150 p.p.s. An "or" gate 72 receives pulses from either of the coincidence gates 31 and 32. Pulses passed by "or" gate 72 are applied to a search-track detector 73. The detector 73 is of the double threshold type which has the advantage of reducing the probability of false lock-on to an insignificant amount. Detector 73 includes a first single shot multivibrator 74 which lengthens and normalizes the amplitude of pulses from gate 72. The lengthened pulses from multivibrator 74 are applied to a first threshold detector 75, the threshold of which is selected to require a finite number of normalized pulses before producing an output pulse. The output pulses of detector 75 are again lengthened and normalized in a second single shot multivibrator 76, whence the normalized pulses enter a second threshold detector 77. Detector 77 also requires a finite number of input pulses before producing an output pulse. Detectors 75 and 77 may suitably comprise RC integrating networks feeding back-biased diodes. Thus, no output will be passed by the detectors until a sufficient charge is accumulated by the networks to exceed the threshold bias. The RC integrators are provided with a discharge path establishing, as a further characteristic of the detectors, that the finite number of pulses required to produce an output must be applied within a fixed time span.

A memory circuit 78, suitably still another single shot multivibrator arranged to discharge a large value capacitor, receives the output of the second threshold detector 77 and controls a relay driver 79. Memory is provided to hold the equipment in the track mode, once that condition is obtained, even though replies from the interrogated station are temporarily lost due to maneuvering or the fact that the interrogated station cannot reply because it is at the moment responding to an interrogation by another aircraft.

When the memory 78 is set by the appearance of an output from detector 77, search-track relay 70 is energized, causing contacts 43 and 71 to move to the T position. The equipment is then in the track mode placing the servomotor 37 under the control of the error signal output of time discriminator 34'. Since fewer reply pulses are received in the track mode than in the search mode, relay 70 also reduces the threshold biases applied to detectors 75 and 77.

It is desirable that the search operation be conducted as rapidly as possible. It is desirable also, that the search only be interrupted for true replies. Since noise and other undesired pulses are randomly present, changeover from search to track operation cannot be made dependent upon the reception of a single pulse. Rather changeover is not effected until a certain number of pulses are received within a certain time. Thus, the probability of false lock-on is greatly reduced.

The search speed is limited by the requirement that a finite number of replies be received and by the rather low interrogation rates fixed as standard. For example, if it were desired to accomplish the entire range search in one second, only 150 interrogations could be performed. If it were further required that five reply pulses be received in order to cause changeover to track operation, the early and late gates feeding the search-track detector are required to be the equivalent of at least 1/30 the maximum range in width, or 6.6 miles in the present equipment. Faster search speeds require even wider gates and the effect of broadening the gates is not only to admit the required number of signal pulses, but also to increase the probability of admitting a greater number of noise pulses.

The double threshold method of detection permits a very favorable compromise between search speed and probability of false lock-on. For example, the early and late gates may suitably each be of 25µs duration. This corresponds to a width of approximately 2 miles each. With a search time of 10 seconds for maximum range, or a range rate of 20 miles/second, a reply from an interrogated station will be within the early or the late gate for 1/5 second, thus supplying a possible 30 true replies upon which to base a decision to switch to the track mode. It is probable that not all 30 replies will be received. It is probable also that certain pulses will appear which are not true replies. If a single threshold were established which required reception of 10 of the 15 pulses anticipated in either of the gates to activate the search-track relay, a figure for the probability of false lock-on can be developed. If this threshold were divided into two thresholds of half value, in other words, five pulses must be supplied to the first threshold, following which the sixth pulse will be passed to the second threshold, it is found, upon developing the probability of false lock-on, that the new figure is less, by at least an order of magnitude, than the former figure. It is therefore possible, by reason of the double threshold search-track detector of the invention, to double the search speed over the optimum search speed of equipment with a single threshold detector while still maintaining equal or better performance.

The accuracy of the equipment may be tested at any time by actuating a test circuit. In the test operation, pulses from the interrogated station are effectively shorted out and pulses from the reference delay line serve as the video input. At the initiation of test, the search-track memory circuit is cleared, causing the equipment to go into the search mode. When the range potentiometer is driven to zero range, the pulses from the reference delay line will be recognized by the search-track detector as a reply and the equipment will switch over to the track mode, thus holding zero indicated range. An indication of other than zero range during test reveals that the equipment is malfunctioning.

Referring to FIG. 1, the test input comprises a switch 80 for applying an enabling voltage to "or" gate 58. This same enabling voltage forward biases a diode network 81 connected to the output line 24 of decoder 18, thus effectively short-circuiting any output from that source. Pulses from the reference delay line 56 will then be passed through "and" gate 57 and "or" gate 26 to the controlled video delay circuit 27, while no output appears from "and" gate 25 because of the disablement of line 24. Closure of test switch 80 also actuates a memory clear circuit 82, suitably a transistor switch connected to discharge the storage capacitor of memory circuit 78. When the memory is cleared, search-track relay 70 switches to the search position, applying constant voltage to the control field of servomotor 37.

The arm of range potentiometer 44 is free to rotate a full revolution. The application of constant voltage to servomotor 37 drives the potentiometer arm in a single direction from the low voltage end towards the high voltage and corresponding to maximum range. When the high voltage end of the potentiometer is reached, rotation is continued in the same direction causing the potentiometer arm to pass abruptly from the high voltage end to the low voltage end. At the low voltage or zero range end of the potentiometer, pulses from the reference delay line 56 will be detected in the search track detector 73, causing changeover of relay 70 to the track mode. Servomotor 37 is then controlled by the error signal output of time discriminator 34', positioning the potentionmeter arm precisely at the voltage corresponding to zero range, assuming the equipment is operating properly. Indicator 45 shows such proper operation by registering zero range.

Obviously, the invention may be practiced otherwise than as specifically disclosed. Various design constants specified herein are dictated by standards established to enable equipments of different types or manufacture to use a common ground facility. The invention should therefore be regarded as limited solely by the scope of the appended claims.

The invention claimed is:

1. Distance measuring equipment comprising
an interrogator for transmitting an interrogation signal to a distant cooperating station,
a receiver for receiving the responsive signal from the cooperating station,
timing means initiated by the interrogation signal and terminated by a control signal for defining a time interval proportional to the control signal,
a delay circuit for delaying the signal from said receiver a variable amount, and
means comparing the termination of said time interval with said delayed receiver signal for adjusting said variable delay.

2. Distance measuring equipment comprising
means for transmitting an interrogation signal to a distant station,
means for receiving a reply to said interrogation signal from said station,
means for measuring the elapsed time between said interrogation and said reply,
means for periodically calibrating said time measuring means against a time standard,
means for delaying said reply by a variable amount, and
means adjusting the amount of said variable delay in accordance with the error in said timing means determined by said calibrating means.

3. Distance measuring equipment comprising,
an interrogator and a receiver for transmitting an interrogation pulse to a remote station and receiving a reply pulse therefrom,
a gate circuit having alternate control signal inputs for generating a timing waveform of duration dependent upon the control signal applied, said waveform being initiated in synchronism with the transmission of an interrogation pulse,
search means providing one of said gate control signals such that the duration of said wave form increases with the transmission of each successive interrogation pulse,
coincidence means responsive to the termination of said waveform and said reply pulses for generating an output pulse for each reply pulse occurring within a fixed time interval of the termination of said waveform,
track means providing the other of said gate control signals such that a fixed interval between termination of said waveform and reception of a reply pulse is maintained,
means responsive to a predetermined number of said coincidence means output pulses for switching control of said gate circuit from said search means to said track means,
means for delaying said reply pulses by a variable amount,
means periodically testing the duration of said timing waveform against a known standard to determine the amount of error in said waveform, and
means adjusting said variable delay means by an amount equal to the error of said waveform.

4. Distance measuring equipment comprising
an interrogator for transmitting an interrogation signal to a remote station,
a receiver for receiving a signal from said station in response to said interrogation,
timing means initiated by said interrogation signal and terminated by a control signal,
tracking means for generating the control signal of said timing means in accordance with a fixed time relationship between termination of said timing means and reception of said response signal,
means periodically substituting a reference signal for the control signal of said timing means,
means initiated by said interrogation signal for simulating a response signal after the lapse of a known interval,
means comparing the termination of said timing means when controlled by said reference signal with said simulated response signal to determine deviation in the termination of said timing means from a predetermined relationship to said simulated response signal,
means for delaying said received response signal a variable amount, and
means adjusting said delay means an amount equal to the deviation determined in said timing means.

5. Distance measuring equipment comprising,
means for transmitting an interrogation signal and receiving a reply thereto from a distant station,
first servo means adjusted in accordance with the time interval separating interrogation and delayed reply signals, and
second servo means for adjusting the amount of delay of said reply signals.

6. Distance measuring equipment comprising,
a transmitter for transmitting an interrogation pulse to a distant station,
a receiver for receiving a reply pulse from the distant station,
means triggered by said interrogation pulse for locally generating a simulated reply pulse,
variable delay means to which either said reply pulse or said simulated reply pulse may be applied to provide a delayed pulse output,
timing means for generating a waveform having a duration proportional to an applied control signal,
a first gate generator triggered by termination of said timing waveform and providing an output of fixed time duration,
a second gate generator triggered by termination of output from said first gate generator and itself providing an output of fixed time duration,
a first coincidence circuit receiving said delayed pulse and the output of said first gate generator,
a second coincidence circuit receiving said delayed pulse and the output of said second gate generator,
means adjusting the control signal of said timing means to cause equal coincidence time of said delayed reply pulse in said first and second coincidence circuits,
means periodically substituting said simulated reply pulse for said reply pulse in said variable delay means and for simultaneously substituting a reference signal for said timing means control signal, and means adjusting said variable delay means to cause equal coincidence time of said delayed simulated reply pulse in said first and second coincidence gates.

7. In a distance measuring system,
a phantastron for generating a waveform of duration proportional to an applied control voltage,
an early gate triggered by the trailing edge of said phantastron waveform to provide an output of fixed duration,
a late gate triggered by termination of output from said early gate,
a controlled delay circuit providing an output delayed from application of input thereto an amount proportional a second control voltage,
a time discriminator comparing time coincidence of output from said delay circuit with outputs from said early gate and said late gate,
means applying a reference signal to the control voltage input of said phantastron,
means applying to the input of said delay circuit a signal having a fixed time relationship to the leading edge of said phantastron waveform, and
means controlled by said time discriminator for adjusting said delay circuit control voltage to cause equal coincidence of the delay circuit output with the outputs of said early gate and said late gate.

8. In a distance measuring system including an interrogator, a receiver, timing means initiated by said interrogator and coincidence means for determining the time relationship of receiver output to output from said timing means,
a search-track detector comprising means for shaping output of said coincidence means into pulses of constant magnitude and duration,
a first threshold detector having upper and lower threshold values and requiring the application of sufficient shaped pulses within a given time to exceed the threshold thereof before producing an output,
second pulse shaping means for converting the output of said first detector into pulses of constant magnitude and duration,
a second threshold detector also having upper and lower threshold values and requiring the application of sufficient shaped pulses from said second means within a given time to exceed the threshold thereof before producing an output, and
switch means actuated by output from said second detector for altering the mode of operation of said system and for selecting the thresholds of said detectors.

9. A search-track detector as claimed in claim 8 with additionally,
a memory circuit for retaining said switch means in an actuated condition for a fixed period following disappearance of output from said second detector.

10. A distance measuring system comprising,
an interrogator for transmitting an interrogation signal to a distant station,
a receiver for receiving a reply signal from said distant station,
a phantastron circuit triggered by said interrogator for generating an output waveform having a duration proportional to an applied control voltage,
a reference delay line receiving an output from said interrogator for generating a reference pulse having a fixed time relationship to the output of said interrogator,
a controlled delay circuit to which either said reply signal or said reference pulse may be selectively applied and providing a time delay proportional to a second applied control voltage,
means periodically applying a reference voltage as the control voltage of said phantastron circuit and simultaneously selecting said reference pulse as the input to said controlled delay circuit,
means operative during application of reference voltage to said phantastron circuit for adjusting said second control voltage to said controlled delay circuit whereby the delay of said controlled delay circuit is adjusted to compensate for variations in the duration of said phantastron output waveform,
means operative during non-application of reference voltage to said phantastron circuit to vary the control voltage thereof to maintain a fixed time relationship between the termination of said phantastron circuit output waveform and said reply signal at the output of said controlled delay circuit, and
test means operative to substitute said reference pulse for said reply signal as input to said controlled delay circuit during operation of said means for varying the control voltage of said phantastron circuit.

References Cited by the Examiner
UNITED STATES PATENTS

| | | | |
|---|---|---|---|
| 2,996,707 | 8/1961 | Hirsch | 343—7.3 |
| 3,197,771 | 7/1965 | Mintzer | 343—7.3 |
| 3,242,489 | 3/1966 | Leyde | 343—7.3 |

CHESTER L. JUSTUS, *Primary Examiner.*

T. H. TUBBESING, *Assistant Examiner.*